April 15, 1958 — H. L. BROWN — 2,830,617
ORIFICE BOX AND FLOW REGULATOR FOR FLUID METERS
Filed March 11, 1954 — 2 Sheets-Sheet 1

INVENTOR.
Harold L. Brown
BY
AGENT

April 15, 1958   H. L. BROWN   2,830,617
ORIFICE BOX AND FLOW REGULATOR FOR FLUID METERS
Filed March 11, 1954   2 Sheets-Sheet 2
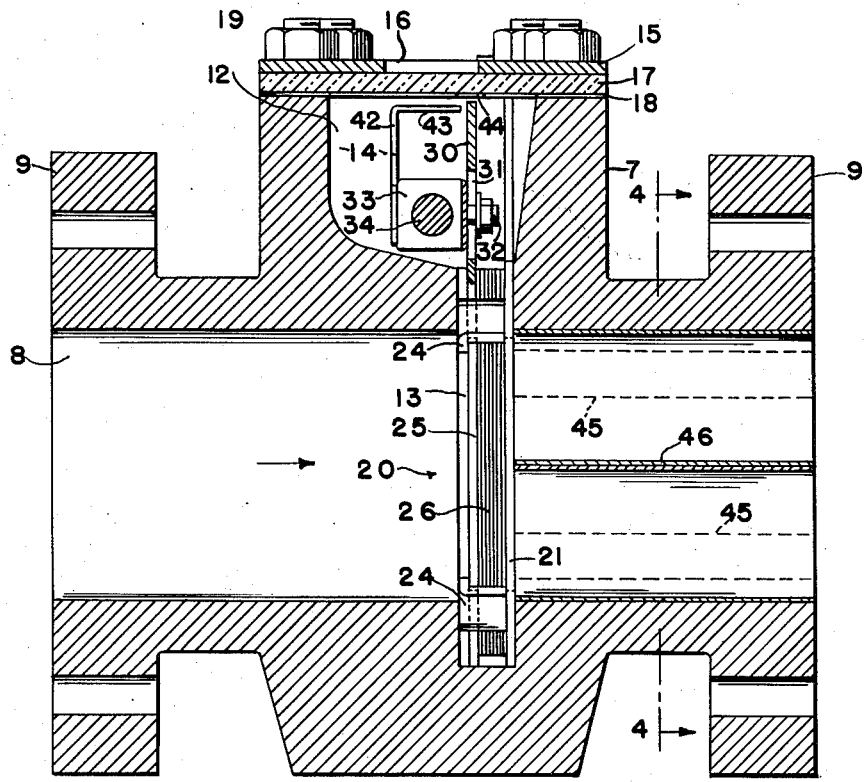
FIG. 3
FIG. 4
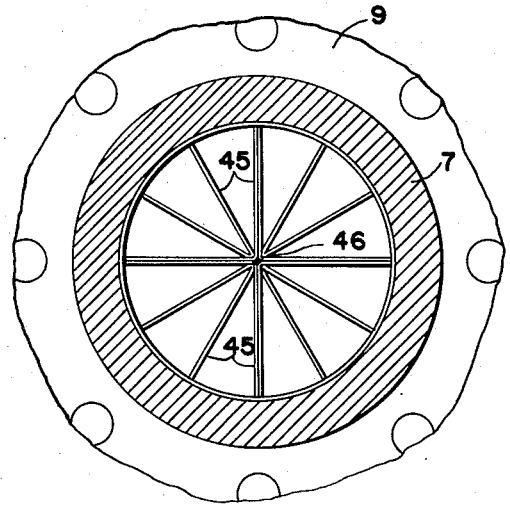
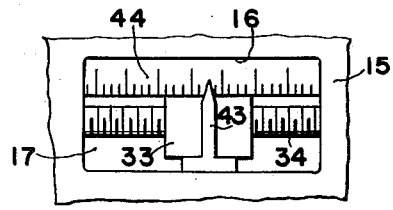
FIG. 5
INVENTOR.
Harold L. Brown
BY Stedman B. Hoar
AGENT

2,830,617

ORIFICE BOX AND FLOW REGULATOR FOR FLUID METERS

Harold L. Brown, Anaheim, Calif.

Application March 11, 1954, Serial No. 415,656

1 Claim. (Cl. 137—553)

This invention relates to devices for regulating the volume of fluids flowing through conduits, and more particularly relates to a variable orifice device for regulating the flow of gas in a gas main, particularly in association with a gas-meter although the invention obviously has other useful applications.

Gas-meters, to be accurate, must be calibrated for an expected flow, and the flow depends upon pressure and pipe-capacity. The pipe-capacity in turn depends upon the smallest pipe-diameter or orifice-diameter near the meter. On industrial gas-lines several inches in diameter, it is customary to install an orifice box close to the meter and on the up-stream side thereof. Such a box will contain an orifice plate having an opening of a size precalculated in relation to an expected normal condition. If the opening proves to be of a wrong size, the line must be closed, the box opened, and a different orifice plate installed in the box. If the expected "normal" conditions do not materialize, or if "normal" conditions vary beyond fairly close limits, the same operation of shut-down and change-over must be performed. The operation normally requires considerable time and labor.

Accordingly it becomes desirable to install a variable orifice which may be adjusted quickly without breaking into the line. However, since it is a requisite of most types of gas-meter that the gas should arrive at the meter with highly stream-lined flow and a minimum of turbulence, ordinary gate-valves or globe-valves are entirely unsuited for this purpose as they do not provide circular openings at all degress of opening. Furthermore the change of opening of such valves is far from constant in relation to change of stem position and the problem of arriving at a pre-calculated size of orifice involves complex and minute calibrations. Even an iris-type valve will create a polygonal and not a true circular orifice, although it may be constructed to provide a substantially true circle at one particular setting. Also, in addition to stream-lining the flow of gas, there is the problem of calibrating the opening to a readily visible scale. Of course in handling inflammable gas under pressure, the housing for an orifice-plate must be gas-tight.

It is therefore an object of my invention to provide a flow-regulator of the orifice box type which may be readily adjusted to meet variable conditions of flow and which delivers gas on its down-stream side in a stream-lined flow suitable for immediate entry into a meter.

A further object of my invention is to provide a flow regulator having a gas-tight housing, a flow index-scale therein readily visible from outside the housing, and adjusting means operable from outside the housing so that the labor and inconvenience of closing down a conduit and opening a housing therein is avoided.

Another object of my invention is to provide a flow-regulator in which movement of arcuate nature directly affecting the degree of opening of a valve is so indexed that positions of the valve which may be considered abnormal in relation to an associated meter are registered with great precision relatively to a mean position more normal to the calculated capacity of the meter.

Further advantages of my invention will appear as the following specification proceeds and from consideration of the accompanying drawings in which:

Fig. 3 is a longitudinal sectional view on the same scale as Fig. 2 and on the line of section 3—3 of Fig. 2;

Fig. 4 is a transverse sectional view on the line of section 4—4 of Fig. 3, showing the stream-lining means on the down-stream side of the orifice; and Fig. 5 is an enlarged fragmentary plan view of the index scale.

Figure 1:
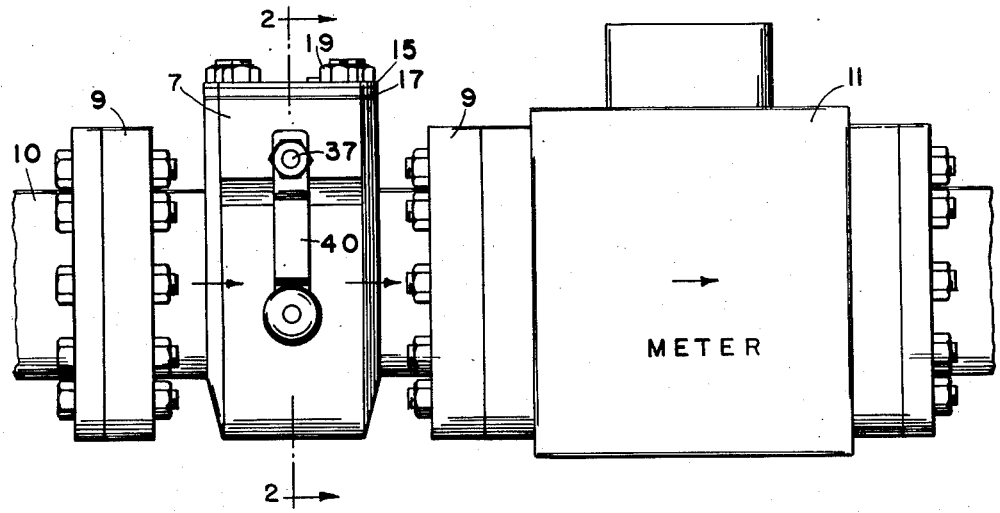
Fig. 1 is a side elevational view of an orifice box according to my invention.
Figure 2:
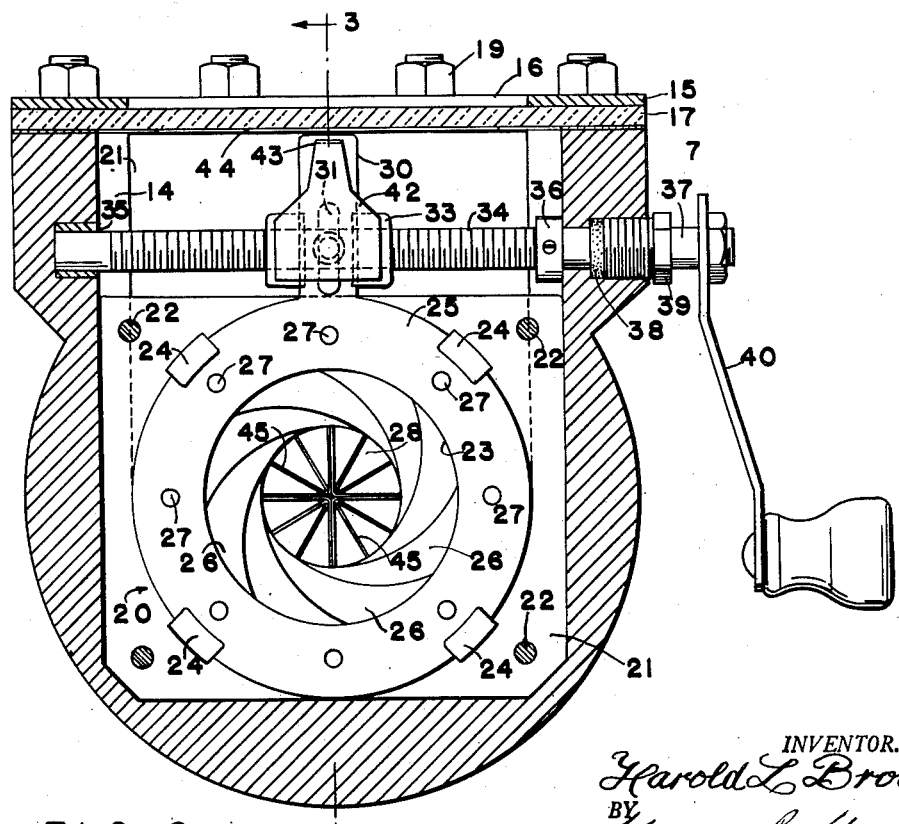
Fig. 2 is a transverse sectional view, on an enlarged scale, on the line of section 2—2 of Fig. 1.

Having reference now to the details of the drawings, my improved orifice-box flow regulator is contained in a housing 7 having a longitudinal bore 8 and having flanged ends 9 by which it may be inserted between and connected to a conduit 10 and to a meter 11. In the upper portion of the housing 7 is a chamber 12 which has a portion 13 extending downwardly transversely of the housing so as to intersect the bore 8. The chamber portion 13 is relatively narrow in the longitudinal direction of the bore 8 so as to provide only a short space between the ends of the bore opening into the chamber portion 13. The upper portion 14 is enlarged to receive the hereinafter described operating mechanism and is sealed to the atmosphere by a cover plate 15 having a window opening 16, and by a glass plate 17 affording a view of the chamber portion 14. Sealing is effected by a gasket 18 compressed by stud-nuts 19.

Within the lower chamber portion 13 is mounted an iris-type valve 20. As the principles of construction of such valves are well-known, and include numerous variations in shape and suspension of the movable shutter blades which may be found suitable for use with this invention, it is not deemed necessary to dwell at length on the particular contruction chosen for illustration. A carrier plate 21 held in position by pins 22, extends downwardly from the upper chamber portion 14 into the lower chamber 13, and has an opening 23 coaxial and coextensive with the bore 8. Clips 24 stand out from one side of the plate 21 to rotatably support and confine a master ring 25 and a plurality of shutter blades 26. The shutter blades 26 are individually slidably and pivotally suitably secured at their one ends to the carrier plate 21, as by pin and slot arrangements (not shown) and are individually pivotally secured at their other ends to the master ring 25, by pins 27, so that rotation of the master ring 25 will pull and pivot the shutter-blades 26 to form a greater or smaller central orifice 28, in the manner well known in the art. In a valve having the function of flow-regulation only, complete closure is not required and may be dispensed with; the number of the blades 26, their curvature or tangency to the orifice 28, and their suspension for more or less free sliding movement and pivotal movement, become matters of choice and convenience.

From the upper rim of the master ring 25, a lever 30 extends into the upper chamber portion 14. The lever 30 has a slot 31, in which a stud 32 slides. The stud 32 is secured in a nut 33 which travels on a threaded shaft 34, being held against rotation by contact with the lever 30. The threaded shaft 34 extends transversely across the upper chamber 14, one end being held in a bushing 35, in which it is held by a collar 36 bearing against the opposite wall of the chamber 14. The unthreaded end 37 of the shaft 34 extends through said opposite wall, in which it is sealed by packing 38 and gland 39, and carries a crank handle 40. It will be apparent that rotation of the crank 40 will cause the nut 33 to move along the shaft 34, thereby causing arcuate movement of the lever 30 as guided by the stud 32 in the slot 31, and thereby further causing rotation of the master ring 25 and of the shutter-blades 26 to increase or decrease the diameter of the orifice 28.

The nut 33 carries an index-finger 42, suitably attached to the nut and having an index-point 43 for registration with a rectilinear scale 44. The scale 44 is preferably disposed just inside the glass plate 17 at the window 16, and may be in the same plane as, or a part of, the gasket 18. As the movement of the stud 32 on the nut 33 is tangent to the arc through which the lever 30 is moved by the stud, it will be clear that angles of arc through which the lever 30 is moved on each side of a central vertical position will be progressively registered by increasing increments of distance through which the index point 43 moves along the scale 44. Thus if the proportions of the iris valve 20 are so chosen with respect to the expected "normal" flow through the conduit 10 and meter 11 that the iris orifice 28 is substantially suited to that flow when the nut 33 is in the central zone of its traverse along the shaft 34, the lever 30 being then in the central portion of its arc, any change in flow requiring an adjustment of the flow-regulator can be adjusted for with a precision increasing with the degree of change. As the accuracy of a meter is fairly constant within its calculated normal range, but varies progressively as the limits of that range are passed, the advantages of progressively precise adjustment of the flow-regulator will be apparent.

From the foregoing it will also be apparent that the normal setting of the iris orifice 28 will not be of the same diameter as the conduit 10 and bore 8, but will be somewhat smaller. The natural effect of the orifice, at any setting of less diameter that the bore 8, is to create turbulence in the flow in the down-stream side of the bore, and such turbulence will adversely affect the accurary of a closely disposed meter. I therefore provide in the down-stream side of the bore 8, between the iris valve 20 and the meter 11, an arrangement of flow-directing vanes 45. Preferably the vanes 45 are arranged in radial formation around a core 46, as such a structure may be slipped into the bore 8, to be held therein between the carrier plate 21 and the flange of the meter 11, and is self-centering. The invention is held to include other vane structures in which the surfaces of the vanes extend longitudinally of the bore 8 in planes parallel to the axis of the bore, so as to quell turbulence occurring at the orifice 28.

I claim:

In an orifice box and flow-regulator for fluid meters: a housing; an iris valve sealed within said housing and arranged when open to permit flow of gases through said housing; a master ring on said valve rotatable to move said valve to selected degrees of opening; a chamber having a sealed window; a lever on said ring extending into said chamber; a threaded member sealed in said housing and extending across said chamber adjacent the path of said lever; said member having operating means extending outside of said housing; a nut on said member; said lever being slidably connected to said nut and arranged for arcuate movement in response to rectilinear movement of said nut along said member; a rectilinear scale parallel to the path of said nut and visible at said window; and a finger on said nut indexing on said scale.

References Cited in the file of this patent
UNITED STATES PATENTS

| | | |
|---|---|---|
| 384,978 | Howe | June 26, 1888 |
| 2,070,326 | Weidinger | Feb. 9, 1937 |
| 2,146,681 | Kronmiller | Feb. 7, 1939 |
| 2,321,336 | Tondreau | Jan. 8, 1943 |
| 2,357,059 | Ray | Aug. 29, 1944 |
| 2,591,478 | Turner | Apr. 1, 1952 |
| 2,688,985 | Holdenfried | Sept. 14, 1954 |

FOREIGN PATENTS

| | | |
|---|---|---|
| 86,276 | Germany | 1895 |
| 85,909 | Sweden | 1936 |
| 607,866 | Great Britain | 1948 |
| 1,027,867 | France | 1953 |